ments. Conversions in excess of 80% are achievable by recycling light ends. Conversion to $C_{12}$ and $C_{12}+$ polymers was about 66%. Of the $C_{12}$ and $C_{12}+$ polymer produced about 90% was in the $C_{13}$ through $C_{16}$ range.

United States Patent Office 2,976,338
Patented Mar. 21, 1961

2,976,338
PROCESS AND CATALYST FOR POLYMERIZATION

Telfer L. Thomas, Sarnia, Lambton, Ontario, Canada, assignor to Esso Research and Engineering Company, a corporation of Delaware No Drawing. Filed Dec. 8, 1958, Ser. No. 778,635

4 Claims. (Cl. 260—683.15)

This invention relates to improved processes and catalysts for the polymerization of unsaturated carbon compounds. In particular, it relates to the liquid phase polymerization of $C_5$ to $C_{15}$ olefinic hydrocarbons.

More particularly, it relates to a process and a catalyst for producing good yields of high quality polymer containing 10 to 30 carbon atoms per molecule by contacting $C_5$ to $C_{15}$ olefins with a catalyst containing boron trifluoride and phosphoric acid of about 100 to 150% concentration.

In one embodiment, the invention relates to the further polymerization of lower boiling olefinic polymers, e.g. dimers and trimers of $C_2$ to $C_4$ olefin monomers, to $C_{12}$ and $C_{12}+$ olefins boiling above about 390° F.

The large use of synthetic detergents has increased the demand for large quantities of $C_{13}$ to $C_{16}$ polyolefins boiling in the 390 to 800° F. range for making detergent alkylate. In the past, dodecylene or tetrapropylene has been an accepted raw material for alkylation with benzene and ultimate conversion to alkyl aryl sulfonate detergents. More recently, the industry has turned to somewhat higher molecular weight olefins, since detergents produced from these olefins possess better foaming characteristics and can be built up in detergent production to give heavy duty performance at less cost. Only a small amount, i.e. about 5% of the yield from a typical tetrapropylene process falls within the $C_{13}$ to $C_{16}$ fractions. Attempts to increase this yield by tetrapropylene recycle have met with little success since the increase in $C_{13}$ to $C_{16}$ production is too small to make this process economical. The term "a typical tetrapropylene process" is used herein to refer to the well known U.O.P. polymerization process wherein propylene and propylene-butylene feedstocks are polymerized to $C_6$ to $C_{15}$ olefins by passage over a catalyst of phosphoric acid on kieselguhr at pressures from 200 to 2000 p.s.i. and temperatures above 280° F.

Higher molecular weight olefins, $C_{16}$ to $C_{30}$, are of value for use in the production of oil-soluble sulfonates and plasticizers, and olefins of both the lower and higher molecular weight are useful as chemical intermediates.

It has now been discovered that a high single run conversion with a high selectivity to $C_{13}$ through $C_{16}$ olefins can be obtained by a liquid phase polymerization of $C_5$ through $C_{15}$, preferably $C_5$ through $C_9$, olefins by intimately contacting the olefinic feed in a reaction zone with 1 to 30 L.V. percent, preferably 5 to 20 L.V. percent, of an acid catalyst containing 3 to 50 L.V. percent, preferably 20 to 40 L.V. percent, of boron trifluoride and 50 to 97 L.V. percent of 100 to 150% phosphoric acid. This highly concentrated phosphoric acid may be made from commercial phosphoric acid and phosphorous pentoxide, or by concentrating commercial phosphoric acid. In one embodiment of this catalyst 50 to 70 L.V. percent of 100 to 150% phosphoric acid is mixed with 30 to 50 L.V. percent of an acid complex prepared by passing boron trifluoride into 100 to 150% phosphoric acid until about 0.4 to 1.0 moles of boron trifluoride are absorbed per mole of acid.

The reaction may be carried out by dispersing the liquid catalyst in the olefinic feedstock, or the catalyst may be adsorbed on a suitable adsorbent such as activated carbon or molecular sieve material. This reaction is conducted at temperatures in the range of 32° to 212° F., preferably 100° to 160° F., and the time of reaction is between ⅛ and 5 hours, depending on the starting material and the desired end product. Single run through total conversions of about 65% are obtainable with this catalyst.

It has further been found that the qualities of the catalysts of this invention can be further enhanced by incorporating therein small amounts of a metal acid fluoride, e.g. 0.05 to 10.0 preferably 0.25 to 2.5 W. percent of potassium acid fluoride based on total catalyst, thus forming a catalyst comprising in combination a major proportion of the aforedescribed boron trifluoride-phosphoric acid combination and a minor proportion of a metal acid fluoride. By this addition total conversions as high as about 75% can be obtained.

The reaction may be carried out at either atmospheric or superatmospheric pressures, e.g. 0 to 2000 p.s.i.g., however, atmospheric pressure is preferred.

This invention may best be understood by reference to the following examples:

EXAMPLE I

A polyphosphoric acid-boron trifluoride catalyst was prepared by mixing 60 volumes of 110% phosphoric acid with 40 volumes of boron trifluoride-phosphoric acid complex. The 110% phosphoric acid was prepared by adding $P_2O_5$ in incremental amounts to 86% phosphoric acid in a ratio of about 132 grams of $P_2O_5$ to 183 ml. of the acid. The boron trifluoride-phosphoric acid complex was prepared by passing boron trifluoride into 100% phosphoric acid at 25° C. until one mole of gas had been absorbed per mole of 100% phosphoric acid.

EXAMPLE II

A polyphosphoric acid-boron trifluoride catalyst was prepared as in Example I except that 1 W. percent $KHF_2$ was added to the solution of Example I. The amount of $KHF_2$ is based on the total catalyst.

EXAMPLE III

Three liters of $C_7$ olefins produced from a copolymerization feedstock of propylene and butylene by a conventional U.O.P. type polymerization using phosphoric acid on kieselguhr was fed into a centrifugal pump type reactor and contacted with 10 L.V. percent of the catalyst of Example I. The reaction was carried out at a temperature of about 130° F. for 1½ hours. The catalyst was then separated and the product neutralized with a 2% sodium carbonate solution. The crude product was then dried and fractionated. Several such runs were made and the results analyzed. Results were checked both with recycle of the light ends and without recycle. In a typical single run, total conversion was about 66%. Conversions in excess of 80% are achievable by recycling light ends. Conversion to $C_{12}$ and $C_{12}+$ polymers was about 66%. Of the $C_{12}$ and $C_{12}+$ polymer produced about 90% was in the $C_{13}$ through $C_{16}$ range.

EXAMPLE IV

The polymer product prepared in Example III was examined by the fluorescent indicator method to determine if the catalyst had caused any deterioration of the olefin. The results of the fluorescent indicator analysis are given below:

$C_7$ starting material _____ 97% olefinic material
$C_{12}+$ polymer product _____ 100% olefinic material
Light ends _____ 75% olefinic material

EXAMPLE V

Liquid phase polymerization of $C_7$ olefins was conducted by employing various catalysts and the results compared with the results obtained in Example III. These results and the conditions under which they were conducted are contained in Table I. The phosphoric acid-boron trifluoride-potassium acid fluoride catalysts shown in Table I were prepared in the same manner as the catalyst of Example II except for differing the amount of $KHF_2$ as recited in the table.

*Table I*

| Catalyst | Olefin Feed | Average Temp., °F. | Reaction Time, Hr. | Percent $C_{12}+$ and $C_{12}$ Conversion | Percent $C_{13}+$ and $C_{13}$ Conversion | Total Products, Percent Selectivity ||||
|---|---|---|---|---|---|---|---|---|---|
| | | | | | | Percent light ends (1-390° F.) | Percent $C_{13}-C_{15}$ (390-460° F.) | Percent $C_{15}-C_{16}$ (460-480° F.) | Percent $C_{16}+$ (480°+ F.) |
| 3:2::86% $H_3PO_4$; $BF_3 \cdot H_3PO_4$ | $C_7$ | 130 | 1½ | 40 | 36.8 | 63.2 | 33.1 | | |
| 8:2::110% $H_3PO_4$; 98% $H_2SO_4$ | $C_7$ | 130 | 1½ | 53 | 47.7 | 52.3 | 40.5 | 3.2 | 3.8 |
| 8:2::110% $H_3PO_4$; 98% $H_2SO_4+1\%$ $CuSO_4$ | $C_7$ | 130 | 1½ | 55 | 50.0 | 50.0 | 42.6 | 2.2 | 5.0 |
| 3:2::100% $H_3PO_4$; $BF_3 \cdot H_3PO_4$ | $C_7$ | 130 | 1½ | 65 | 56.5 | 43.5 | 50.4 | 0.9 | 4.8 |
| 3:2::110% $H_3PO_4$; $BF_3 \cdot H_3PO_4$ with ½ Wt. percent $KHF_2$ | $C_7$ | 130 | 1½ | 68 | 64.1 | 35.9 | 55.5 | | |
| 3:2::110% $H_3PO_4$; $BF_3 \cdot H_3PO_4$ with 1½ Wt. percent $KHF_2$ | $C_7$ | 130 | 1½ | 75.9 | 70.0 | 30.0 | 57.7 | 4.0 | 8.0 |

The boron-trifluoride-phosphoric acid complex is too highly reactive to be a suitable polymerization catalyst when used alone since the rapid evolution of heat resulting tends to cause deterioration of the polymer product.

Phosphoric acid alone does not effect polymerization at normal temperatures and pressures.

The term L.V. percent as used herein shall be understood to mean liquid volume percent.

The term W. percent as used herein shall be understood to mean weight percent.

All percentages recited herein unless otherwise designated shall be understood to refer to weight percents.

What is claimed is:

1. An improved polymerization catalyst which comprises in combination a major proportion of a boron trifluoride-phosphoric acid admixture containing 3 to 50 liquid volume percent of boron trifluoride and 50 to 97 liquid volume percent of 100 to about 110 weight percent phosphoric acid, and a minor proportion of a potassium acid fluoride.

2. A catalyst in conformance with claim 1 wherein said minor proportion constitutes 0.05 to 10 weight percent of said catalyst.

3. A catalyst in conformance with claim 2 wherein said minor proportion constitutes 0.25 to 2.5 weight percent of said catalyst.

4. An improved process for polymerizing $C_5$ to $C_{15}$ olefins which comprises intimately contacting said olefins in a reaction zone with 1 to 30 liquid volume percent of an acid catalyst which comprises in combination a major proportion of a boron trifluoride-phosphoric acid admixture containing 3 to 50 liquid volume percent of boron trifluoride and 50 to 97 liquid volume percent of 100 to about 110 weight percent phosphoric acid, and a minor proportion of a potassium acid fluoride, at a temperature in the range of 32° to 212° F. and a pressure in the range of 0 to 2000 p.s.i.g. for a period of time in the range of ⅛ to 5 hours.

References Cited in the file of this patent

UNITED STATES PATENTS

| | | |
|---|---|---|
| 2,416,106 | Linn et al. | Feb. 18, 1947 |
| 2,721,889 | Murphree et al. | Oct. 25, 1955 |
| 2,810,774 | Sernink | Oct. 22, 1957 |
| 2,814,655 | Langlois et al. | Nov. 26, 1957 |
| 2,816,944 | Muessig et al. | Dec. 17, 1957 |